United States Patent
Chen et al.

(10) Patent No.: US 11,835,547 B2
(45) Date of Patent: Dec. 5, 2023

(54) METHOD FOR DETECTING MECHANICAL AND MAGNETIC FEATURES WITH NANOSCALE RESOLUTION

(71) Applicant: National Cheng Kung University, Tainan (TW)

(72) Inventors: Yi-Chun Chen, Tainan (TW); Yi-De Liou, Changhua County (TW); Yi-Hsin Weng, Taoyuan (TW)

(*) Notice: Subject to any disclaimer, the term of this patent is extended or adjusted under 35 U.S.C. 154(b) by 86 days.

(21) Appl. No.: 17/680,340

(22) Filed: Feb. 25, 2022

(65) Prior Publication Data
US 2023/0168275 A1 Jun. 1, 2023

(30) Foreign Application Priority Data
Nov. 26, 2021 (TW) ................ 110144221

(51) Int. Cl.
G01Q 30/06 (2010.01)
G01Q 60/38 (2010.01)
B82Y 35/00 (2011.01)

(52) U.S. Cl.
CPC .......... G01Q 30/06 (2013.01); B82Y 35/00 (2013.01); G01Q 60/38 (2013.01)

(58) Field of Classification Search
CPC ......... G01Q 30/06; G01Q 60/38; B81Y 35/00
See application file for complete search history.

(56) References Cited

U.S. PATENT DOCUMENTS

| | | | |
|---|---|---|---|
| 5,572,125 A * | 11/1996 | Dunkel | G01R 33/483 324/309 |
| 8,650,660 B2 | 2/2014 | Shi et al. | |
| 8,739,309 B2 | 5/2014 | Hu et al. | |
| 9,322,842 B2 | 4/2016 | Hu et al. | |
| 11,237,185 B2 | 2/2022 | Matejka et al. | |
| 11,346,857 B1 * | 5/2022 | Daugela | G01N 29/46 |
| 2006/0123895 A1 | 6/2006 | Lee et al. | |
| 2011/0035849 A1 | 2/2011 | Finlan et al. | |
| 2015/0190061 A1 * | 7/2015 | Godavarty | G01J 3/0272 600/328 |

FOREIGN PATENT DOCUMENTS

| | | |
|---|---|---|
| CN | 104502635 A | 4/2015 |
| CN | 104991089 B | 1/2019 |
| TW | 201809676 A | 3/2018 |

* cited by examiner

*Primary Examiner* — Nicole M Ippolito

(57) ABSTRACT

The method for detecting mechanical and magnetic features comprises the steps of: aiming a probe of the sensor at a sample; defining several detected points for detection on the sample; detecting one of points and comprising the steps of: approaching the probe to the detected point from a predetermined height; contacting the probe with the detected point and applying a predetermined force on the detected point; making the probe far away from the detected point until to the predetermined height; shifting the probe to the next point for detection and repeating the detection; collecting the data of each of the detected points while the probe rapidly approaches to the points from the predetermined height; using a signal decomposition algorithm to transform the collected data to a plurality of data groups; and choosing a part of the data groups to be as data of feature distributions of the sample.

8 Claims, 18 Drawing Sheets

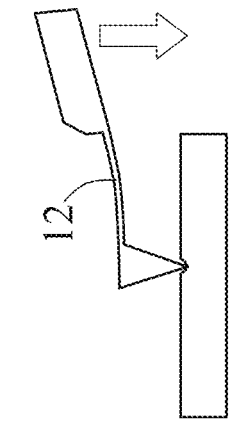
FIG. 4A
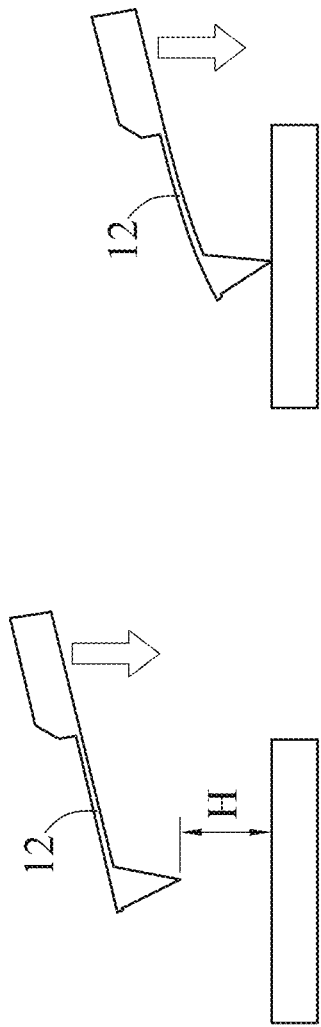
FIG. 4B
FIG. 4C
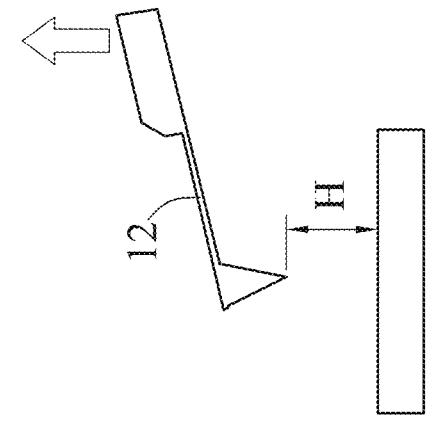
FIG. 4D
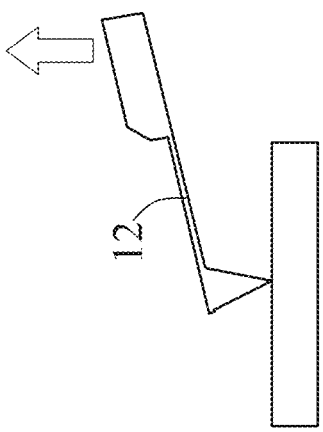
FIG. 4E $$\begin{bmatrix} \alpha_{11} & \alpha_{12} & \cdots & \alpha_{1n} & \alpha_{1n+1} & \cdots & \alpha_{1F} \\ \alpha_{21} & \alpha_{22} & \cdots & & & & \\ \alpha_{31} & \alpha_{32} & \cdots & & & & \\ \vdots & \vdots & & & & & \vdots \\ \alpha_{N1} & \alpha_{N2} & \cdots & & & & \alpha_{NF} \end{bmatrix}$$

FIG. 7

METHOD FOR DETECTING MECHANICAL AND MAGNETIC FEATURES WITH NANOSCALE RESOLUTION

BACKGROUND OF THE INVENTION

1. Field of the Invention

The present invention is in related to a method for detecting physical features, more particular to a method for detecting mechanical and magnetic features of a sample with an assistance of artificial intelligence.

2. Description of the Prior Art

Magnetic force microscope (MFM) is an atomic force microscope (AFM) which scans magnetic samples through a magnetized AFM probe, in order to detect the interaction between the probe and the magnetic stray field above the sample surface for measuring the magnetic distribution or magnetic structure of the surface of the sample. In addition, its resolution is on the class of hundreds of nanometers as usual, limited by the probe radius and the probe-sample distance. On the other hand, the following shortcomings are still existed for the traditional magnetic force microscope and listed below:

(1) In order to avoid the influence of van der Walls forces, twice of detection is a need. The first detection is to let the probe be closer to the surface of the sample for measuring the data of the influence; the second detection may be a longer distance between the probe and the surface of the sample for acquiring the data of magnetic forces. To conclude the data of the influence and the magnetic forces, the magnetic distributions of the sample surface are generated. Since the first detection is very close to the surface, it will be greatly affected by van der Waals forces, and thus it is not easy to know the distributions of the magnetic forces at close range. The second detection is under the condition of a longer distance, the signals of the magnetic forces are relatively weak and the spatial resolution of the magnetic distributions is worse as well. That are because the magnetic force is inversely proportional to the square of the distance and the diverging magnetic lines of adjacent magnetic domains are mixed together, respectively.

(2) For confirming the magnetization direction of each magnetic domain on the surface of the sample, i.e. N pole or S pole, the magnetic pole of the probe should be reversed and then detected again, which will reduce the detection efficiency as well.

For more shortcomings, another patent with application number U.S. Ser. No. 17/585,570 has more discussions. As it can be seen, how to design a method for detecting the magnetic distributions with high efficiency and precision becomes an important issue to persons who are skilled in the art.

SUMMARY OF THE INVENTION

The main object of the present invention is to provide a method for detecting the mechanical and magnetic features of a sample, and it improves the detection efficiency and spatial resolution.

The method for detecting mechanical and magnetic features comprises the steps of:
aiming a probe of the sensor at a sample; defining a plurality of points to be detected on the sample; detecting one of the plurality of points and comprising the steps of: approaching the probe to the point from a predetermined height; contacting the probe with the point and applying a predetermined force on the point; making the probe far away from the detected point until to the predetermined height; shifting the probe to the next point to be detected and repeating the detection; collecting the data of each detection while the probe approaches and retracts between the points and the predetermined height; using a signal decomposition algorithm to transform the collected data to a plurality of data groups; and choosing a part of the data groups to be as data of feature distributions of the sample.

In some embodiment, the sensor is a magnetic force microscope, and one of the data groups corresponds to magnetic distributions of the sample.

In some embodiment, the signal decomposition algorithm is a principal components analysis algorithm.

In some embodiment, the signal decomposition algorithm is sparse coding algorithm, independent component analysis algorithm, or factor analysis algorithm.

In some embodiment, the data is a change of cantilever deflection of the probe with respect to time.

In some embodiment, a range of the predetermined height is 50-250 nm.

In some embodiment, the data groups are transformed to a plan view.

The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIG. 4A to FIG. 4E illustrate continuous views of the probe detecting the magnetic zone on the sample of the present invention;

FIG. 7 is a data format stored in an extraction process of the present invention;

DETAILED DESCRIPTION OF THE INVENTION

In order to describe the technical content in detail, structural features, achieved objectives and effects of the instant application, the following detailed descriptions are given in conjunction with the drawings and specific embodiments. It should be understood that these embodiments are only used to illustrate the application and not to limit the scope of the instant application.

All of the figures of the present invention are schematic views, and shown the relationships among the modules and signals, but the ratios of the circuits' dimensions, the signals' waveforms and the frequencies are not included.

Figure 1A:
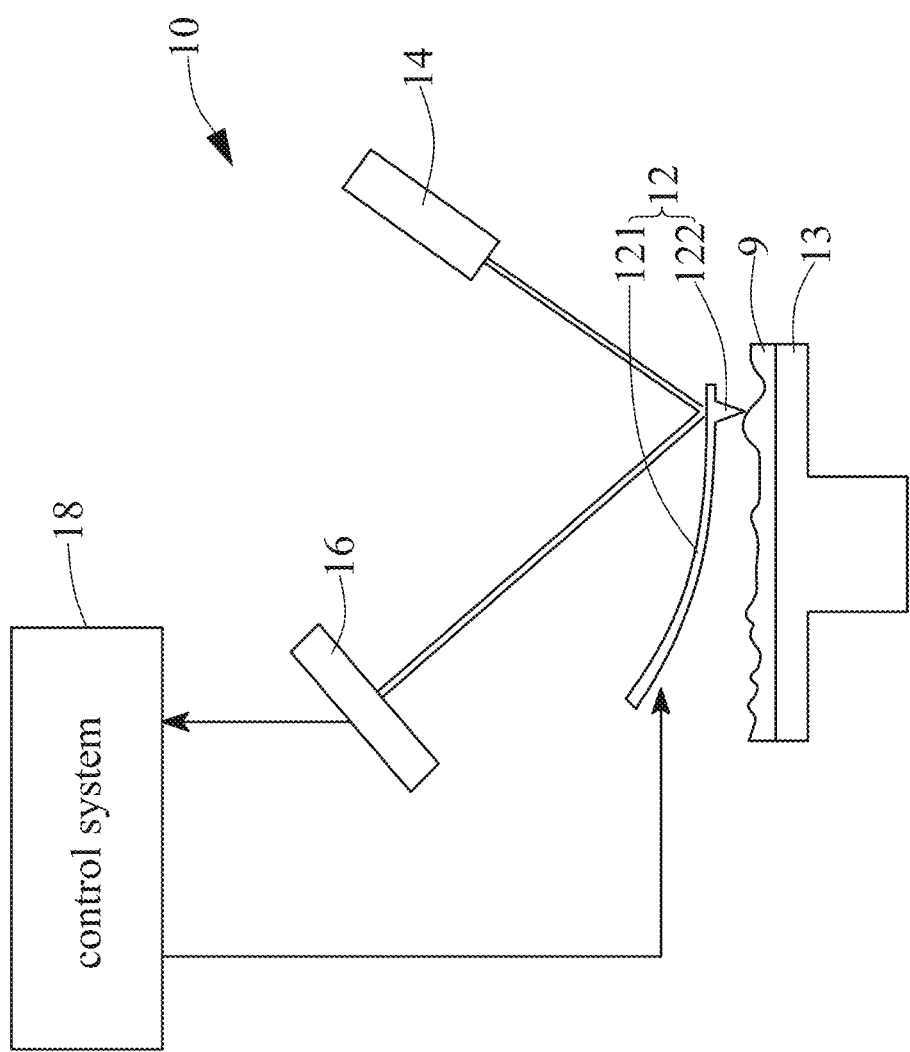
FIG. 1A illustrates a schematic view of a sensor, magnetic force microscope, of an embodiment of the present invention.

Referring to FIG. 1A, which illustrates a schematic view of a sensor, magnetic force microscope, of an embodiment of the present invention. A sensor 10 includes a probe 12, a sample carrier 13, a laser head 14, a quad-cell position-sensitive photodetector 16 (hereinafter PSPD 16), and a control system 18. The probe 12 includes a cantilever 121 and a tip 122. The tip 122 is located at the front end, bottom side of the cantilever 121. The laser head 14 emits a laser beam to the front end, high-reflective upper side of the cantilever 121. The PSPD 16 is employed to read the reflected laser beam from the perturbed cantilever of the AFM probe. In addition, a sample 9 is loaded on the sample carrier 13, and for example, a 3-axis piezoelectric actuator is disposed on the sample carrier 13 for adjusting a distance between the sample 9 and the tip 122 in the way of fine-tuning.

Figure 1B:
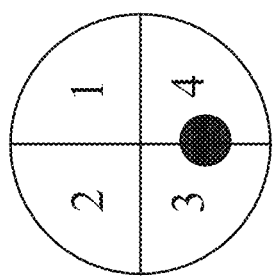
FIG. 1B illustrates a schematic view of a PSPD used by an optical lever system when a probe is in detection.
Figure 1B:
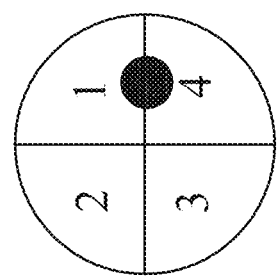

With reference to FIG. 1B, which illustrates a schematic view of the PSPD used by an optical lever system when the probe is in detection. When the sample 9 and the tip 122 are closely reaching to each other, the sample 9 is applying a force to the probe 12, then the cantilever 121 is deflected or twisted. In case of the cantilever 121 being deflected or twisted, the position of a reflected laser beam to the PSPD 16 may be changed, so as to acquire the deformation of the cantilever 121 and then the forced situation of the probe 12. As shown in FIG. 1B, the PSPD 16 is divided into four quadrants that are numbered 1, 2, 3, and 4, and they are named as the first quadrant 1, the second quadrant 2, the third quadrant 3, and the fourth quadrant 4. When the reflected laser beam injected on the PSPD 16, each quadrant outputs a signal corresponding to light intensity received thereof, and the signals from the four quadrants may be different. Therefore, the vertical deflection degree of the cantilever 121 is equal to that of the sum of the signals in the first quadrant 1 and the second quadrant 2 minus the sum of the signals in the third quadrant 3 and the fourth quadrant 4, as shown in the upper figure of FIG. 1B. Relatively, the horizontal deflection degree of the cantilever 121 is equal to that of the sum of the signals in the first quadrant 1 and the fourth quadrant 4 minus the sum of the signals in the second quadrant 2 and the third quadrant 3, as shown in the lower figure of FIG. 1B. Therefore, as a short brief, the positions of the reflected laser beam injecting on the PSPD 16 disclose the forced situations of the probe 12 after the control system 18 processing the signals.

By measuring the change of van der Waals forces between the probe 12 and the sample 9, the surface profile of the sample 9 is now acquired. For the embodiment, the tip 122 of the probe 12 is magnetic and magnetized, so that the magnetic distributions of the surface of the sample 9 is measured. On the other hand, the van der Waals forces and magnetic forces from the sample 9 may be exerted to the tip 122 of the probe 12 simultaneously, therefore the detected data will be further processed in order to gain the surface profile and magnetic distributions. Following is a flow chart for the proposed method for detecting mechanical and magnetic features of sample.

Figure 2A:
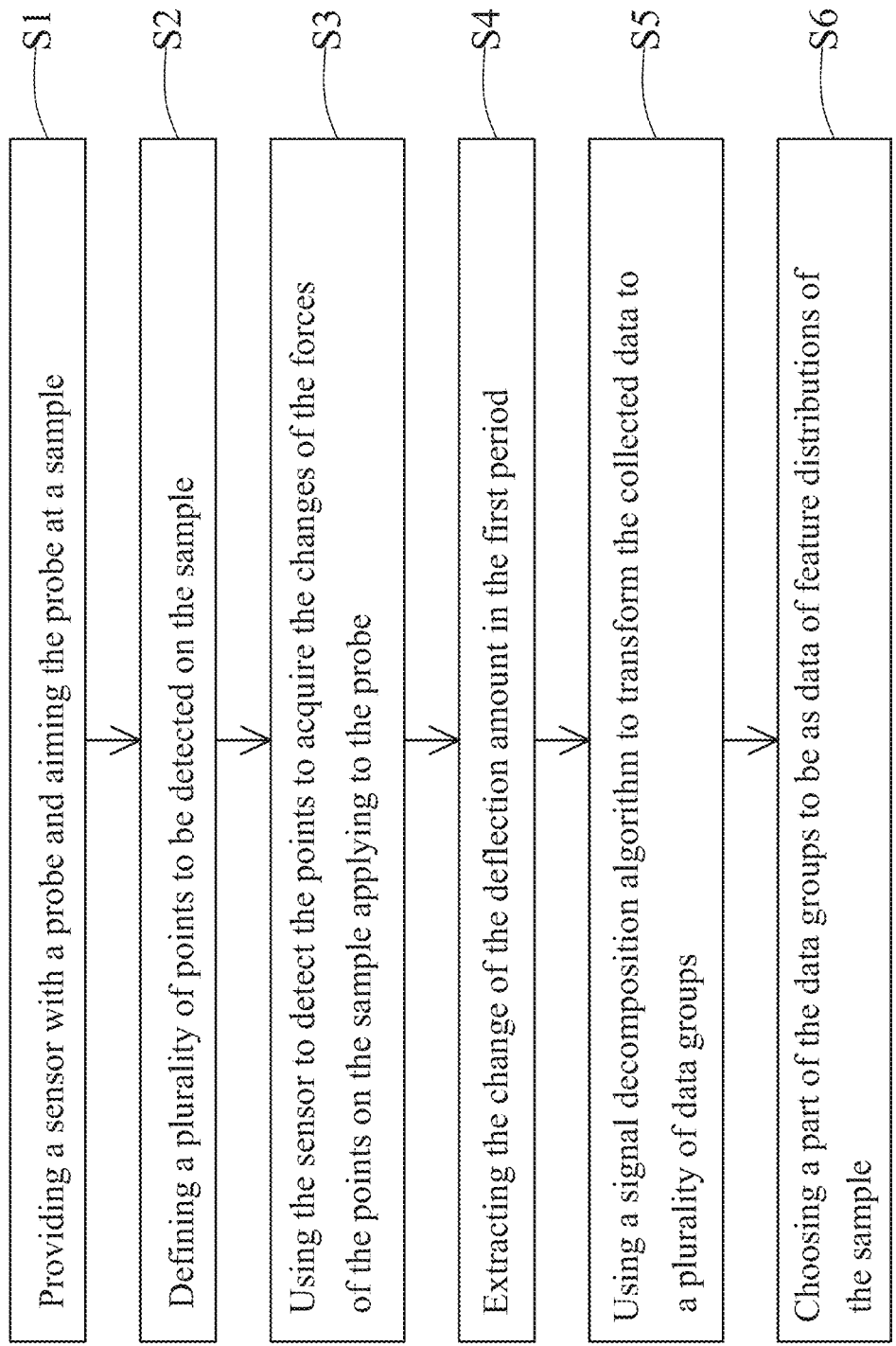
FIG. 2A illustrates a flow chart of an embodiment of the method for detecting mechanical and magnetic features of the present invention.

With reference to FIG. 2A, which illustrates a flow chart of an embodiment of the method for detecting mechanical and magnetic features of the present invention.

Figure 2B:
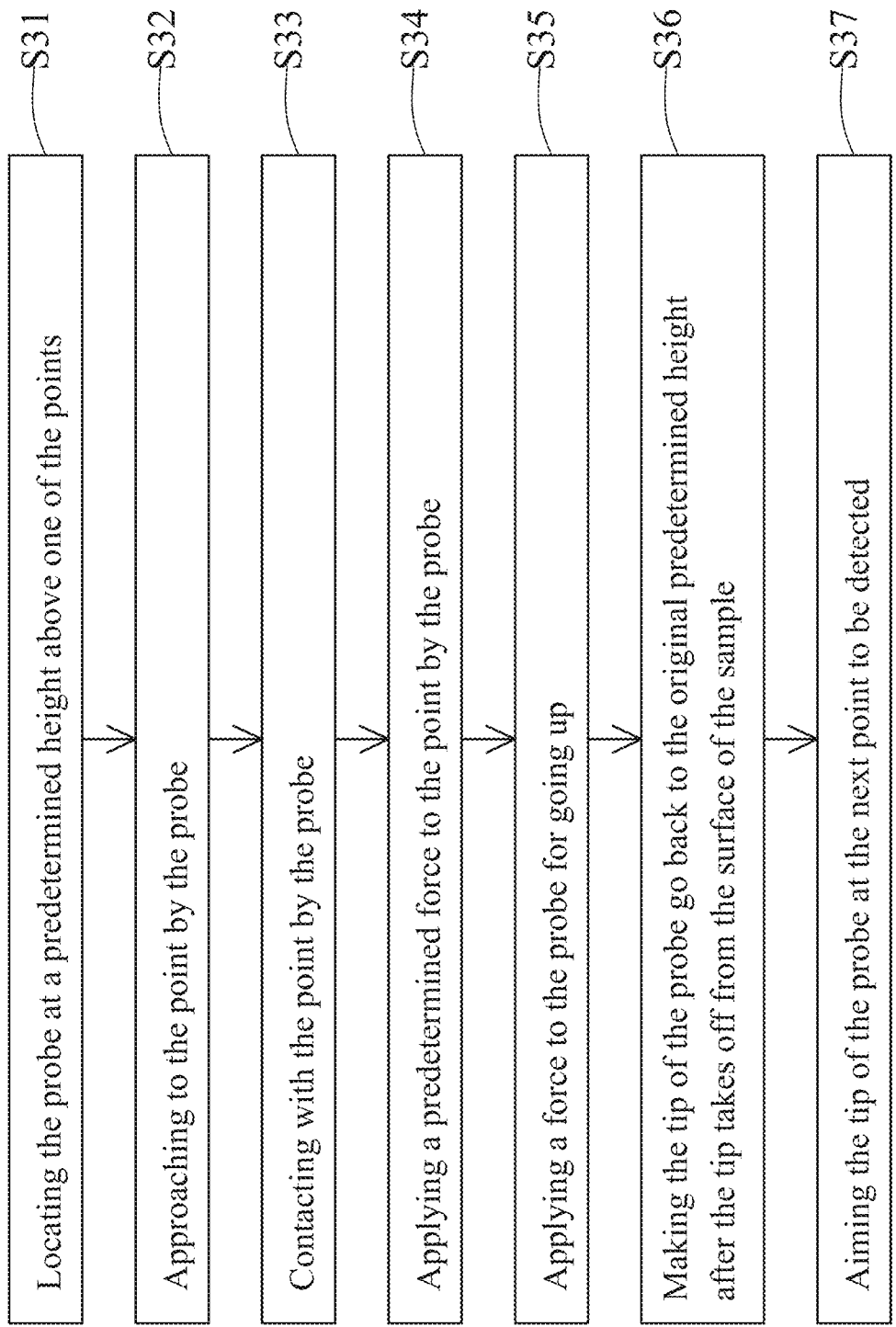
FIG. 2B illustrates a practical flow chart of the probe detecting a magnetic zone on a sample of the present invention.
Figure 3:
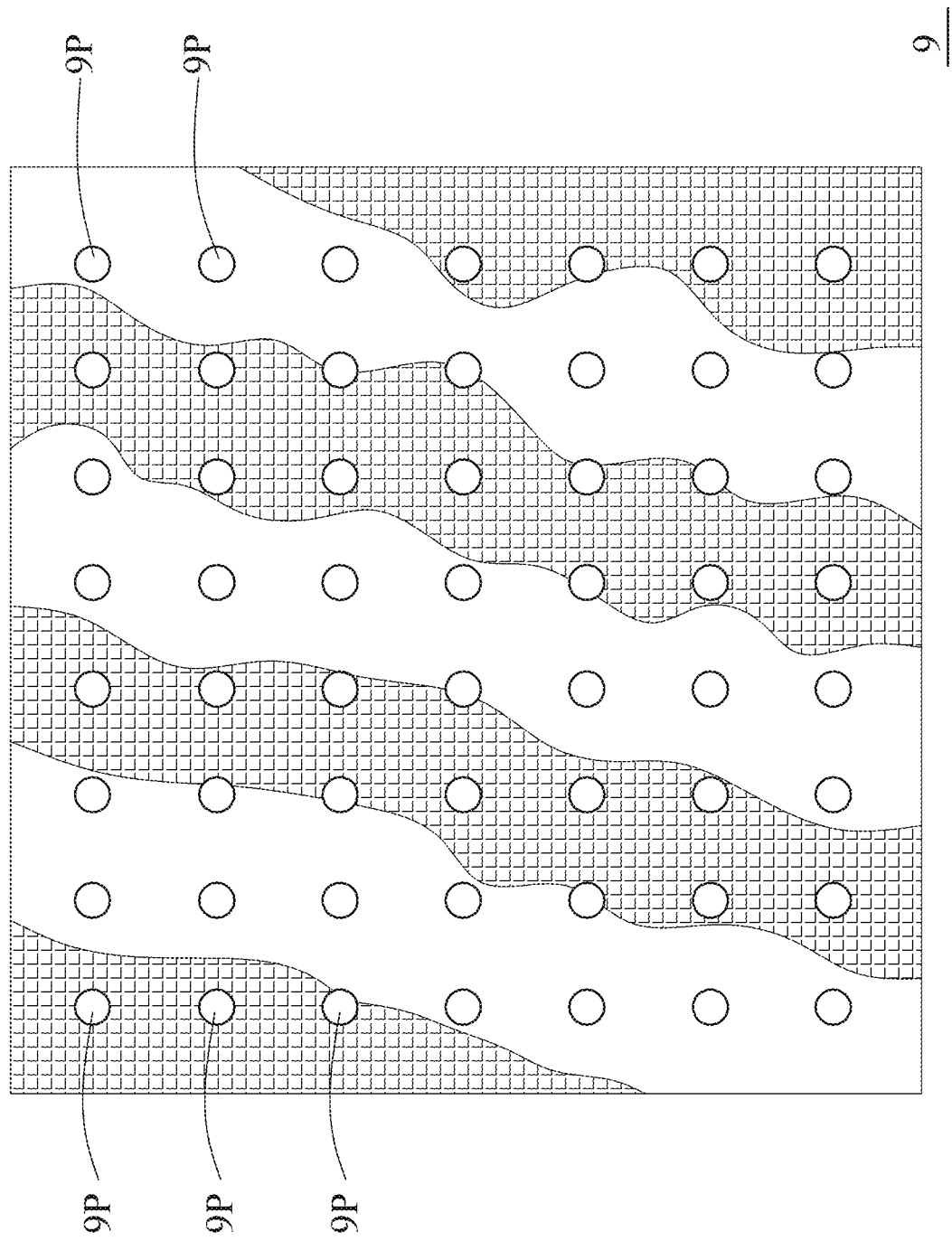
FIG. 3 illustrates a schematic top view of the sample of the present invention.

With respect to FIG. 2A and FIG. 2B, FIG. 3 illustrates a schematic top view of the sample of the present invention. The step (S1) is that of providing the sensor 10 with the probe 12, as shown in FIG. 1A, and aiming the tip 122 of the probe 12 at the sample 9. The sample 9 is a magnetic tape and its surface has a banded magnetic zone. Please be noted, the magnetic zone on the sample 9 as shown in FIG. 3 is a schematic view. In addition, the material of the sample 9 is a ferromagnetic material that is beneficial to observe the magnetic distributions because of its strong magnetism.

The step (S2) is that of defining a plurality of points 9P to be detected on the sample 9. The points 9P are detected by the sensor 10 and arranged in a matrix, for example, FIG. 3 only shows 64 points 9P. As a matter of fact, there are more points 9P in practice such as 256*256, which means 65,536 points 9P. The people skilled in the art should know that the more points 9P come with the higher resolution for imaging the magnetic distributions.

Figure 5:
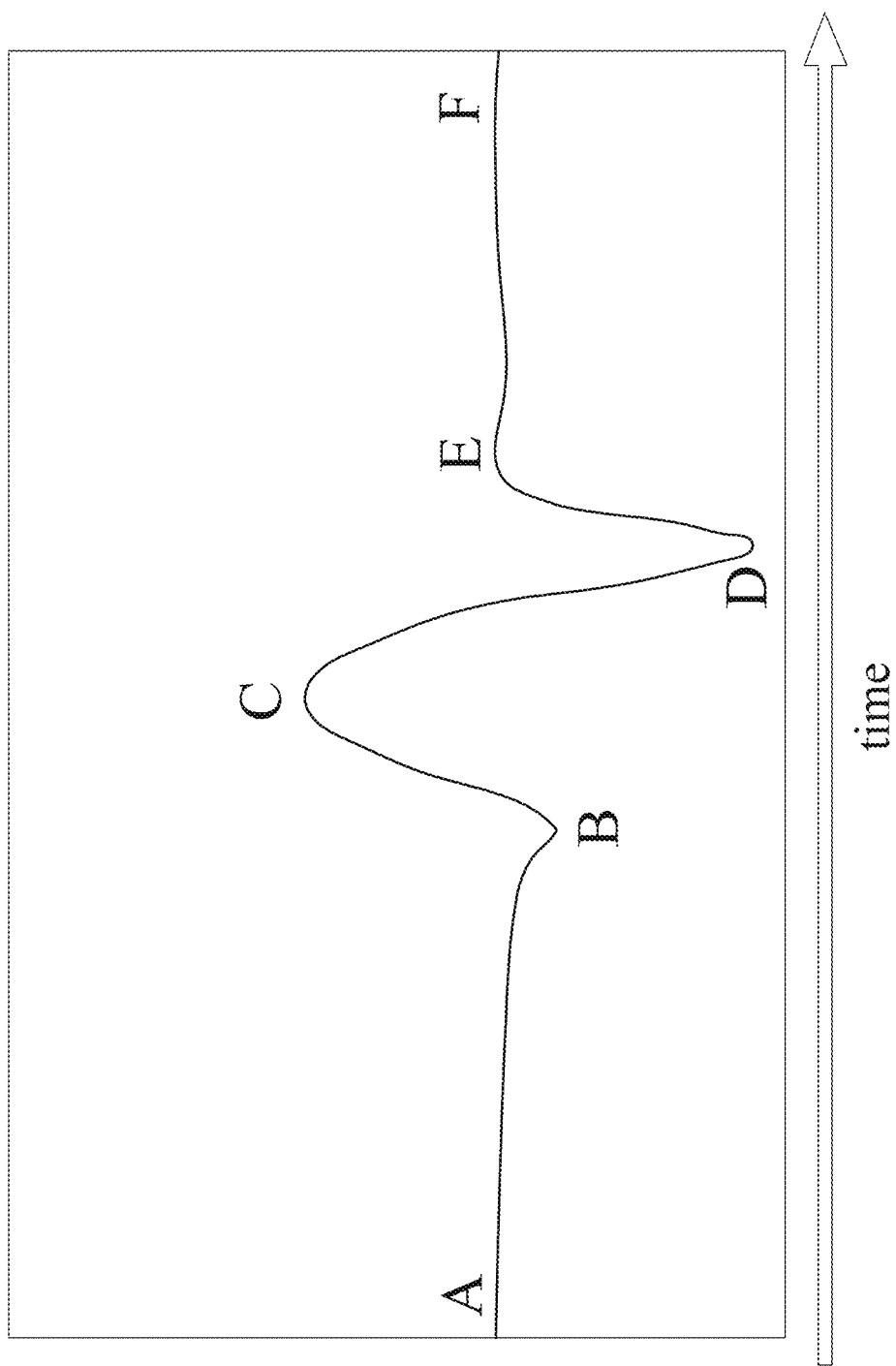
FIG. 5 illustrates a schematic view of forced situations of the probe while the probe is in detection.

The step (S3) is that of using the sensor 10 to detect the points 9P to acquire the changes of the forces of the points on the sample 9 applying to the probe 12. In accordance with FIG. 2B, FIG. 4A to FIG. 4E, and FIG. 5 simultaneously, FIG. 2B illustrates a flow chart of the sensor 10 detecting the points 9P of the present invention, FIG. 4A to FIG. 4E illustrate continuous views of the probe detecting the magnetic zone on the sample of the present invention, and FIG. 5 illustrates a schematic view of the forced situations of the probe while the probe is in detection. As shown in FIG. 4A, the step (S31) is to let the probe 12 be located at a predetermined height H above one of the points 9P, wherein the range of the predetermined height H is between 50 to 250 nm. The probe 12 will be affected by a little attractive force (van der Waals force) from the sample 9 when the probe 12 is at the predetermined height H, corresponding to a point A in FIG. 5. FIG. 4B represents that the step (S32) is of the probe 12 approaching to the point 9P (2 kHz per cycle). In the meantime, since the sample 9 is closer to the probe 12 every second, the sensed attractive force of the sample 9 is increasing, such as shown from the point A to a point B in FIG. 5. The step (S33), corresponding to FIG. 4C, is that of the probe 12 contacting with the point 9P, also referring to the point B in FIG. 5. The step (S34) is of the probe 12 applying a predetermined force to the point 9P. Meanwhile, the probe 12 generates a repulsive force due to the applied force from the sample 9, therefore the forced situations are changed, as shown from the point B to a point C in FIG. 5. The step (S35), as shown in FIG. 4D, is to apply a force to the probe 12 for going up. Since the sample 9 applies the attractive forces (the van der Waals forces and viscosity forces) to the probe 12, the tip 122 of the probe 12 and the sample 9 may not be separated immediately, therefore the forced situations of the probe 12 may be shifted from the point C to a point D in FIG. 5. At the point D, the attractive force received by the probe 12 will reach the maximum. Continuously, the step (S36), as shown in FIG. 4E, is of the tip 122 of the probe 12 going back to the original predetermined height H after the tip 122 takes off from the surface of the sample 9. Presently, the forced situations of the probe 12 is changed from the point D to a point E in FIG. 5. After that, a stable state is kept to a point F in FIG. 5.

Figure 6:
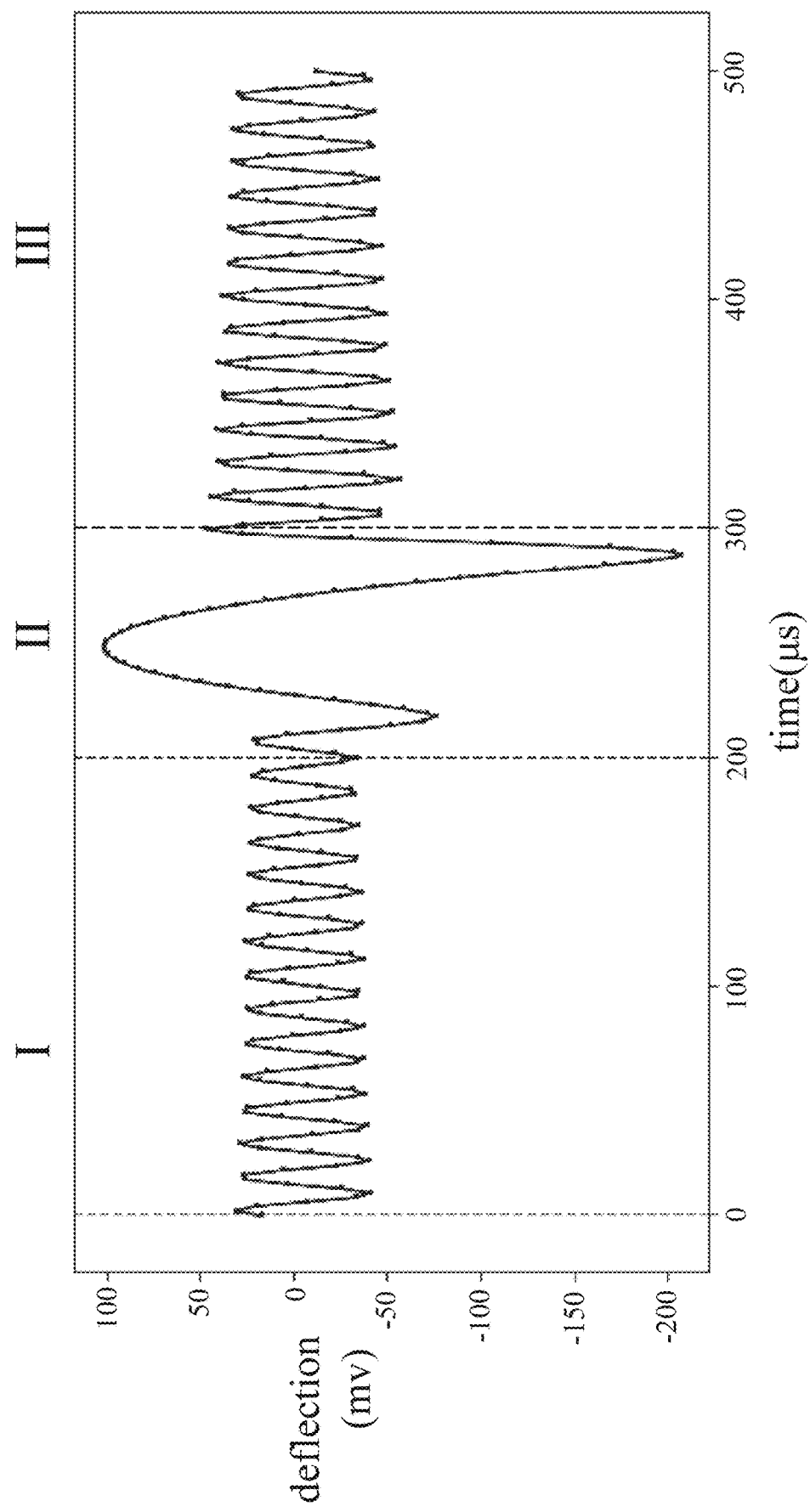
FIG. 6 illustrates a schematic view of real-time changes of the sensed data (cantilever deflection)

Please refer to FIG. 6, which illustrates a schematic view of real-time changes of the sensed data (cantilever deflection) when the probe is rapidly approached to and sequentially retracted from the sample surface (shown as FIG. 4A-FIG. 4E). It could be observed that the cantilever of the probe is naturally resonant/ringing due to the fast contact event in each transient cycle. The first period corresponds to the stroke traveled by the tip 122 of the probe 12 in the step (S32), that is, corresponds to the point A to the point B in FIG. 5. The second period corresponds to the point B to the point E in FIG. 5, and is reached a larger cantilever deflection in the forced situations. The third period agrees with the point E to the point F in FIG. 5. The step (S37) is to horizontally move the tip 122 of the probe 12 in order to aim at the next point 9P. Then the step (S31) to the step (S36) shall be repeated till that all of the points 9P are detected. Further information is mentioned here. According to FIG. 6, the vibration of the point 9P in the first period is a continuous vibration of the previous point 9P in the third period. The damping effect is a reason to make the situation of the vibration in the first period being smaller than the vibration in the third period. There is another issue, that is, how did the first point 9P vibrate during the first period? A reference point (not shown in figure) on the surface of the sample 9 can be chosen first, and thus the step (S31) to the step (S36) are repeated, so as to let the probe 12 generate the vibration in the third period, as shown in FIG. 6, continuously to detect the points 9P.

As shown in FIG. 6, the unit of the vertical axis is mV that is the unit of the output signal of the PSPD 16. Which means, the absolute value of the output voltage from the PSPD 16 is higher when the cantilever 121 of the probe 12 is bended further from the central point. Through system calibration, this voltage value can be used to infer the force acted on the cantilever 121 of the probe 12.

With reference to FIG. 2A, the step (S4) is to extract the change of the cantilever deflection of the probe 12 detecting the points 9P in the first period. The reasons to pick up the change of the cantilever deflection in the first period to analyze continuous detection results are described as follows. The inventor finds out that the second period is a period that the van der Waals forces is seriously influenced by the drastic undulation changes during the scanning process, therefore the acquired data from the second period are ignored. Further that, the signals of vibrations in the third period may be influenced by the dirt on the surface of the sample 9 to worse signals, even if the vibrations of the first period and the third period are similar to each other. Otherwise, the detected result, the changes of the cantilever deflection in the third period, can be used for continuous analyzation. Thus, the collected detection data is represented by a Matrix A in FIG. 7, which is a data format stored in an extraction process of the present invention. In FIG. 7, each row vector is defined as the detection on each point 9P. The step (S5) is that of using a signal decomposition algorithm to transform the collected data to a plurality of data groups. For the embodiment, the signal decomposition algorithm is Principal Components Analysis (PCA); but for some other embodiments, it could be Sparse Coding Algorithm, Independent Components Analysis Algorithm, or Factor Analysis Algorithm.

Figure 8A:
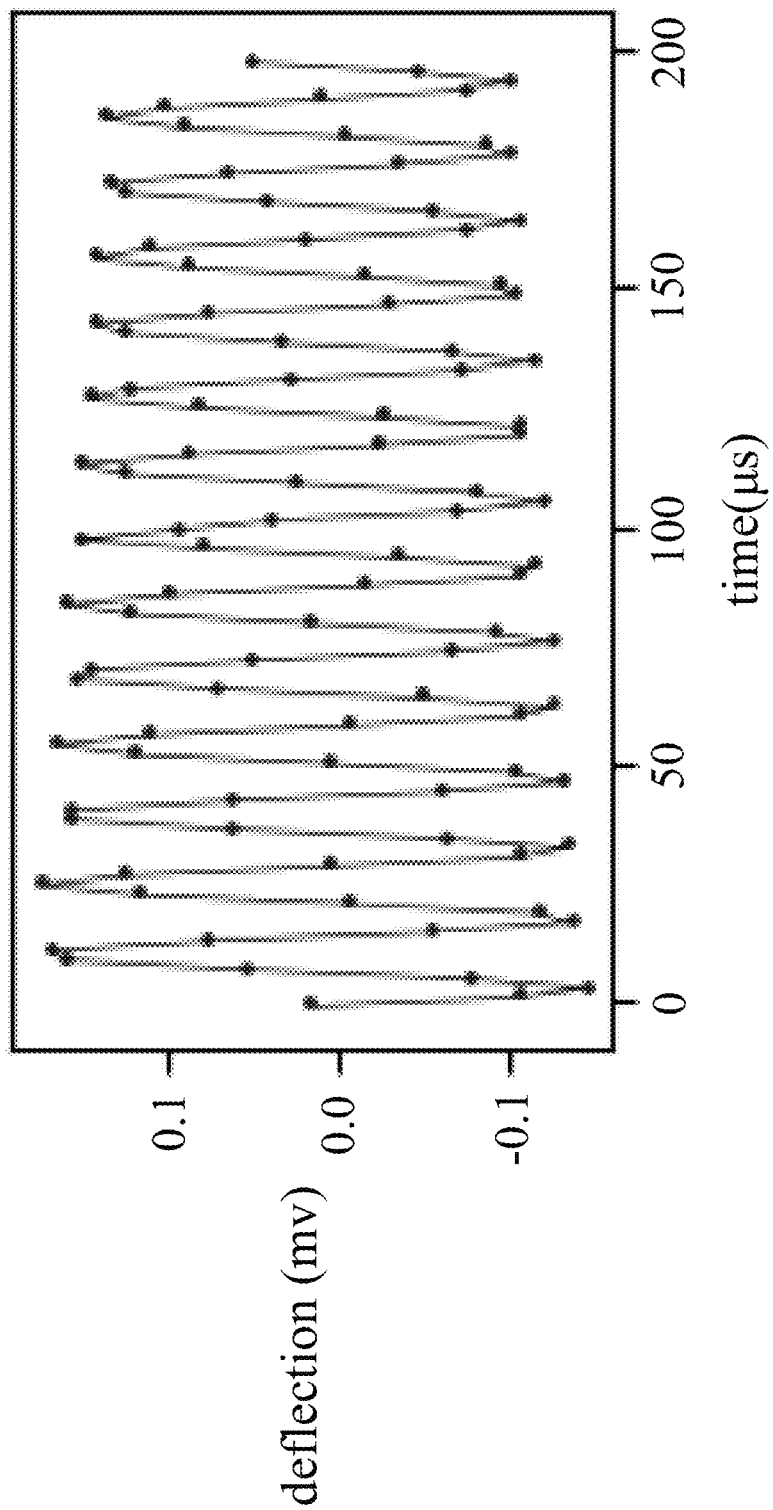
FIG. 8A to FIG. 8C illustrate a first principal component after going through Principal Components Analysis, the detected data mapped to a plan view of the first principal component, and a schematic view of surface viscosity distributions, respectively.
Figure 8B:
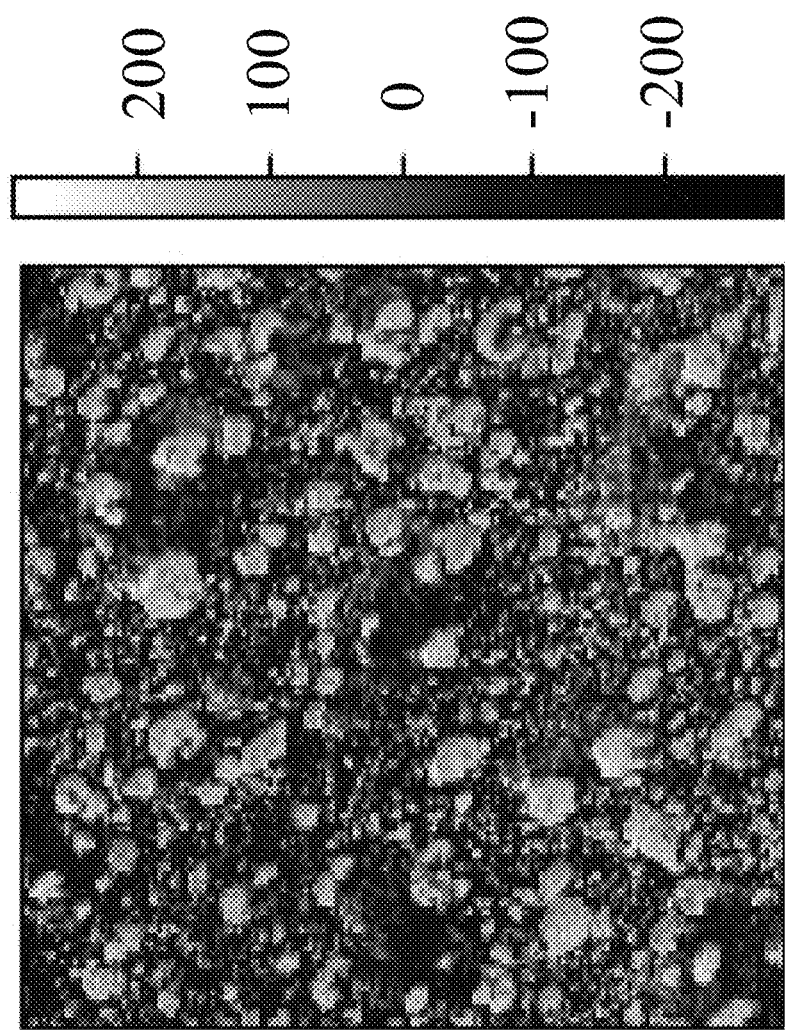
Figure 8C:
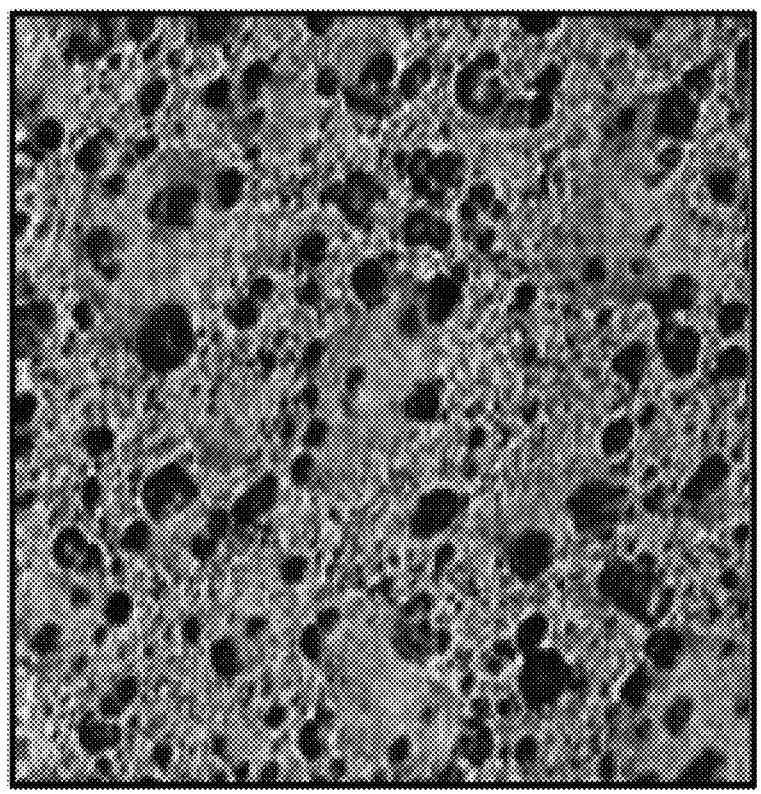

The embodiment is to map the collected detected data to different principal components via Principal Components Analysis, so as to form the plurality of data groups. The principal component is the eigenvector of the covariance matrix of matrix A (Eigenvector). With respect to FIG. 8A and FIG. 8B, which illustrate a first principal component after going through Principal Components Analysis and the detected data mapped to a plan view of the first principal component. In FIG. 8B, the brighter the brightness represents a positive correlation with the first principal component, and the darker the brightness represents a negative correlation with the first principal component. For instance, the value of a dark point is −1 in FIG. 8B, which means the changes of the instantons cantilever deflection of the first principal component is opposite to FIG. 8A's, and vice versa. According to the inventor records, FIG. 8B is very similar to FIG. 8C, which illustrates a schematic view of surface adhesion distributions of the sample 9 detected by prior arts. Therefore, FIG. 8B is treated as a surface adhesion distribution view of the sample 9.

Figure 9A:
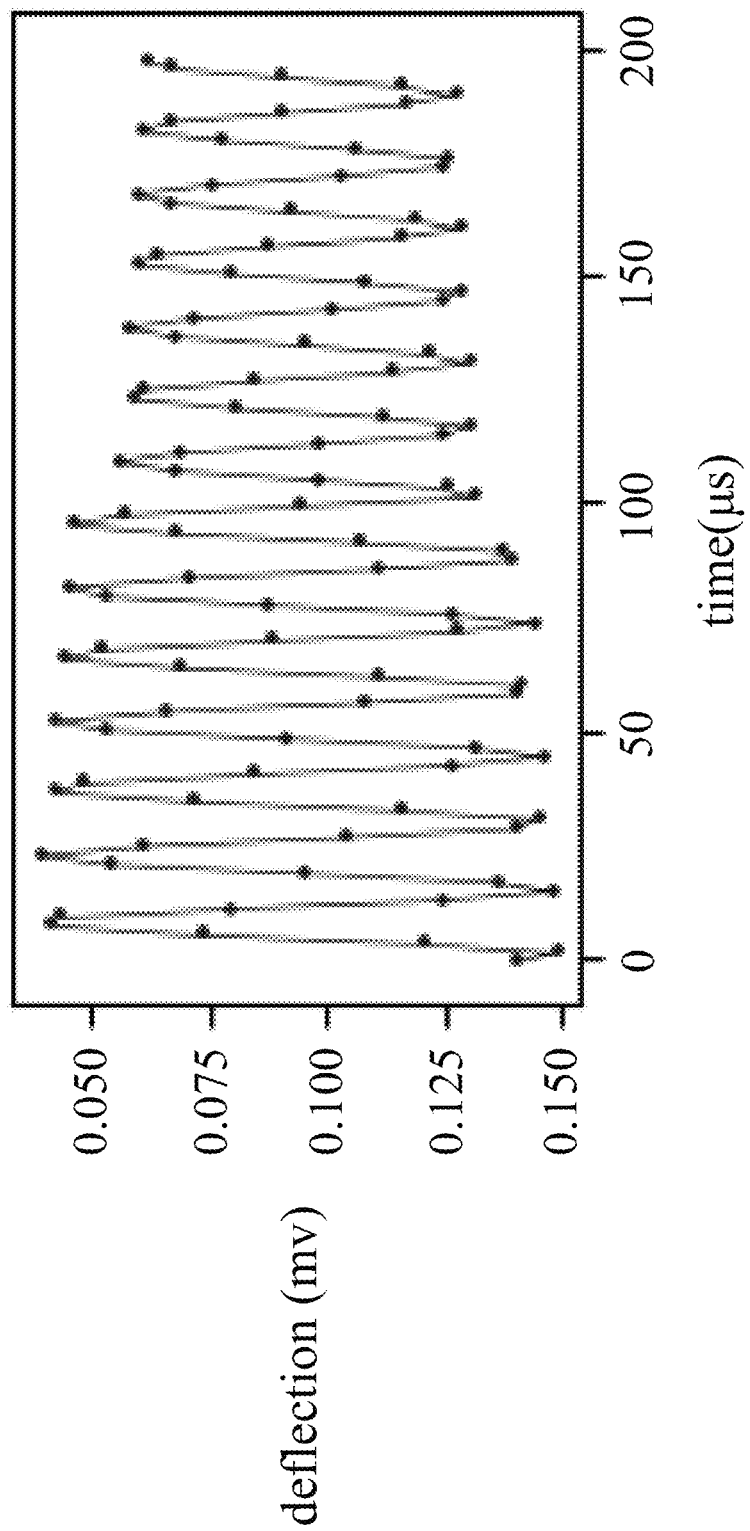
FIG. 9A to FIG. 9C illustrate a third principal component after going through Principal Components Analysis, the detected data mapped to a plan view of the third principal component, and a schematic view of surface deflection distributions, respectively.
Figure 9B:
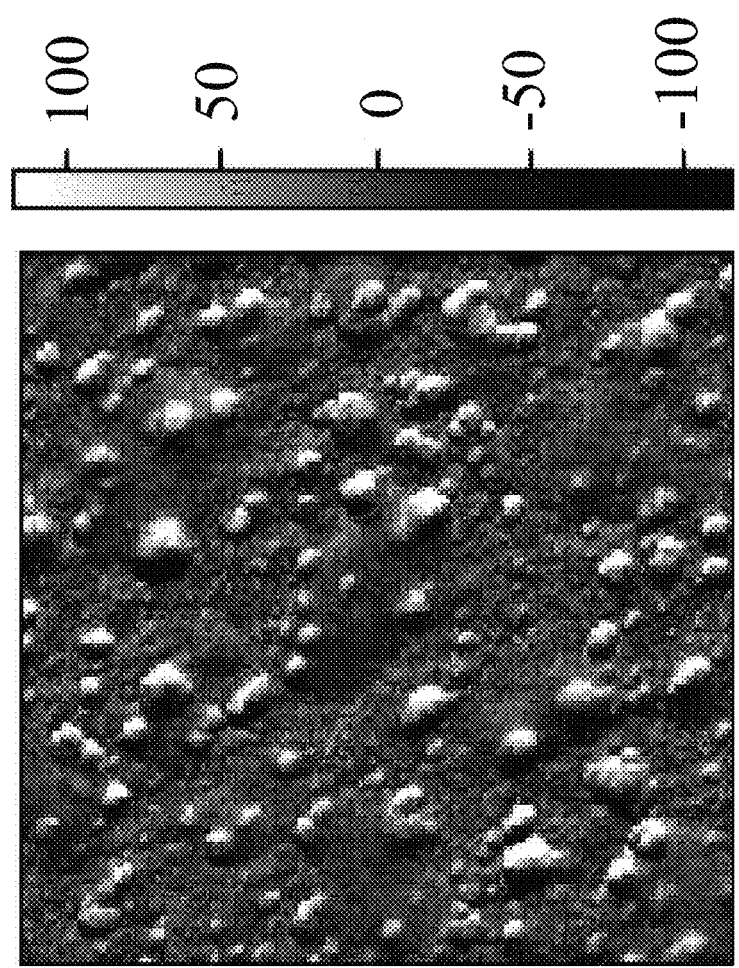
Figure 9C:
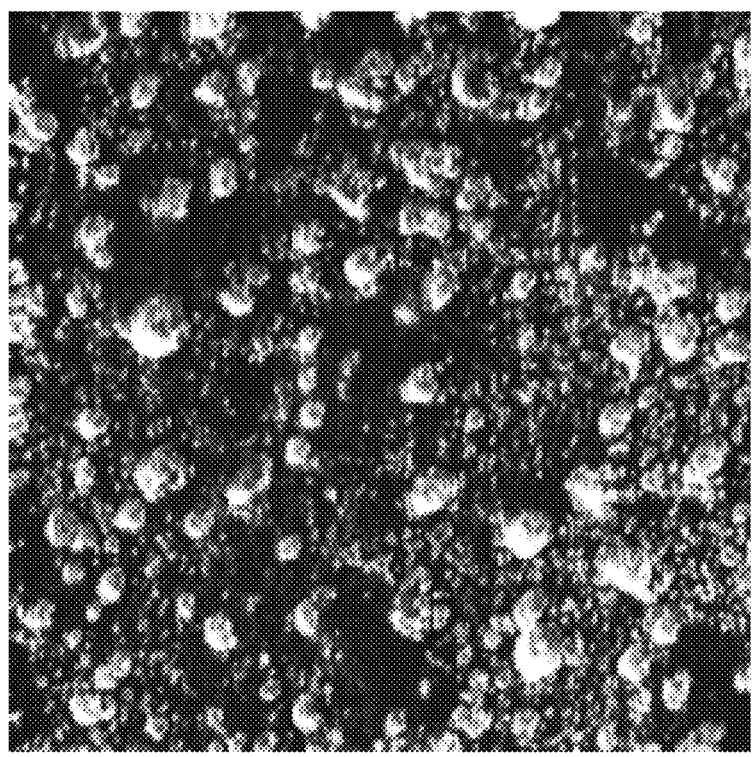

Based on FIG. 9A and FIG. 9B, which illustrate a third principal component after going through Principal Components Analysis and the detected data mapped to a plan view of the third principal component. FIG. 9B is similar to FIG. 8B, so it may not be described any further thereto. According to the inventor records, FIG. 9B is very similar to FIG. 9C, which illustrates a schematic view of surface deformation distributions of the sample 9 detected by prior arts. Therefore, FIG. 9B is treated as a surface deformation distribution view of the sample 9.

Figure 10A:
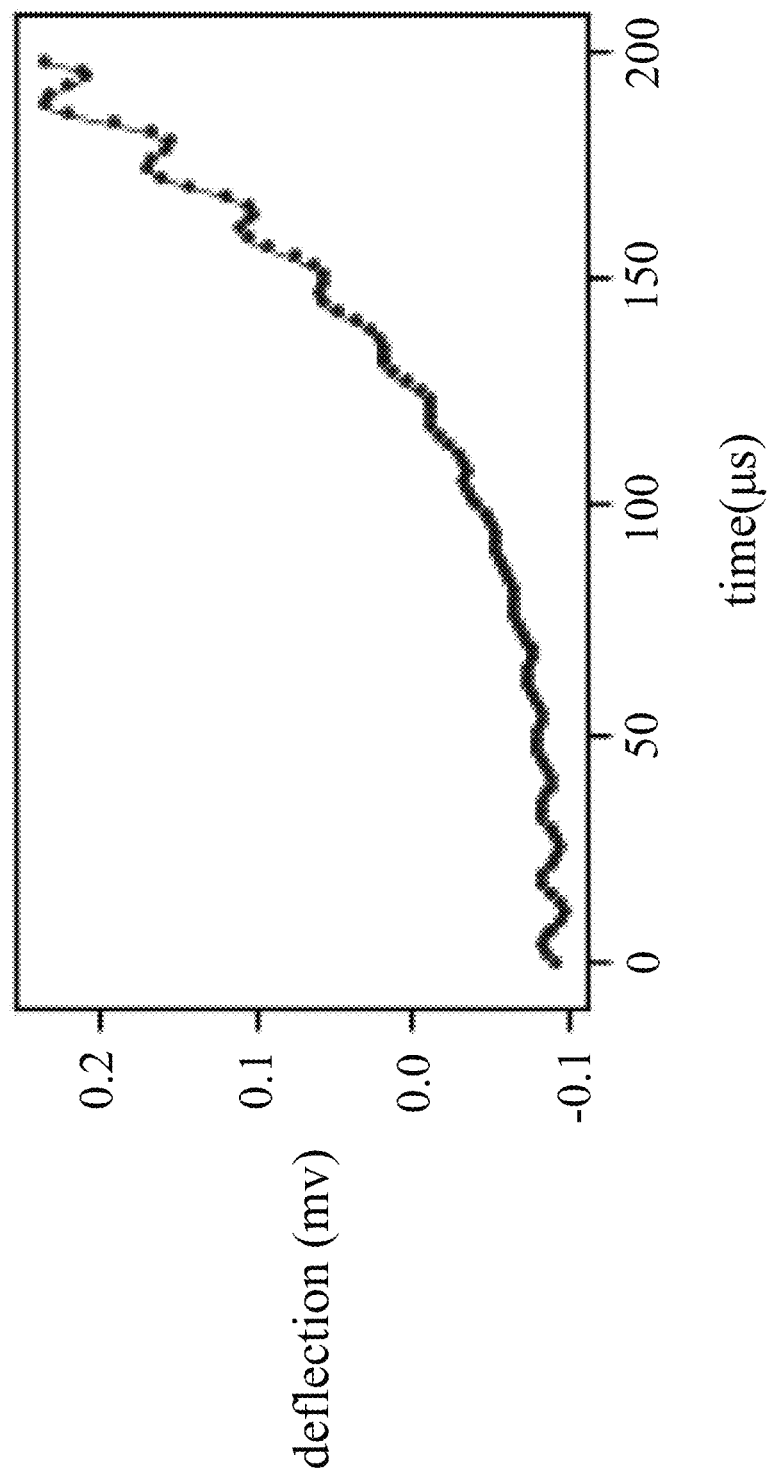
FIG. 10A to FIG. 10C illustrate a sixth principal component after going through Principal Components Analysis, the detected data mapped to a plan view of the fifth principal component, and a schematic view of surface magnetic force distributions, respectively.
Figure 10B:
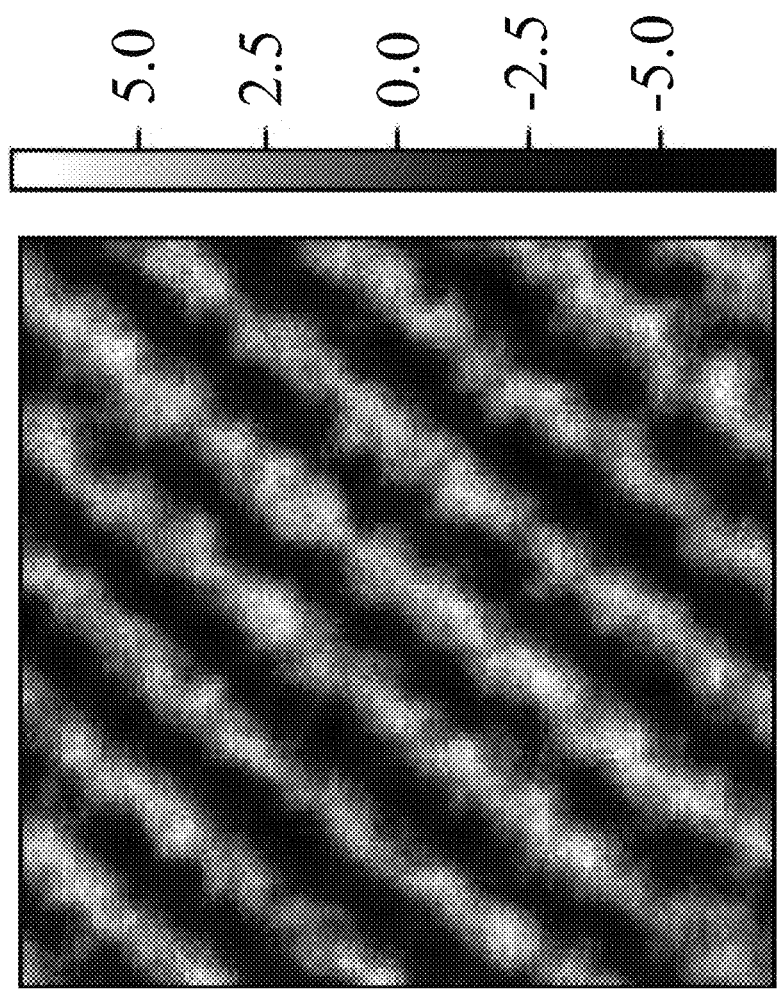
Figure 10C:
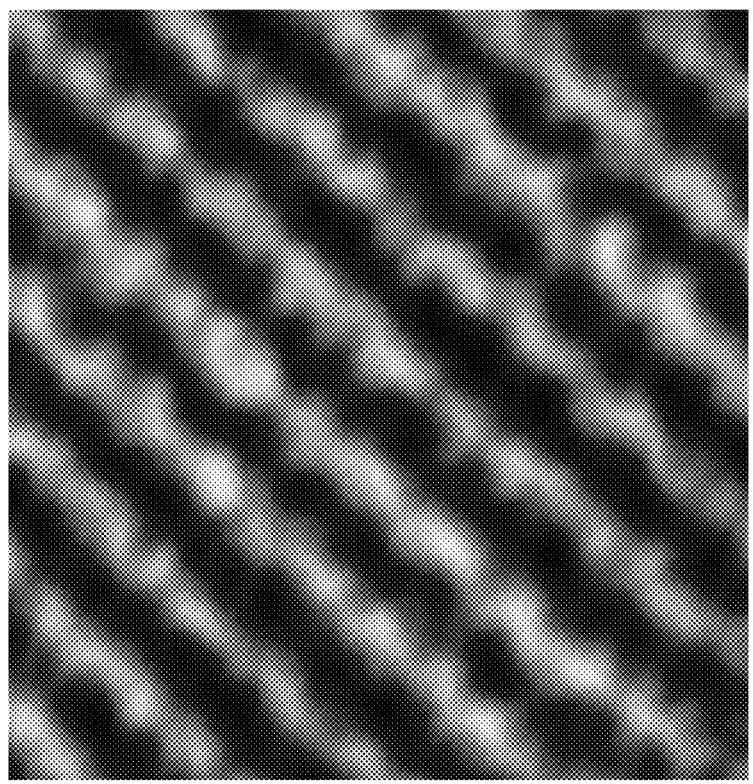

Referring to FIG. 10A and FIG. 10B, which illustrate a sixth principal component after going through Principal Components Analysis and the detected data mapped to a plan view of a sixth principal component. FIG. 10B is similar to FIG. 8B, so it may not be described any further thereto. According to the inventor records, FIG. 10B is very similar to FIG. 10C, which illustrates a schematic view of surface magnetic force distributions of the sample 9 detected by prior arts, and FIG. 10B is even clearer than FIG. 10C. Therefore, FIG. 10B is treated as a surface magnetic force distribution view of the sample 9.

As aforesaid, compared with the feature distributions of the surface of the sample 9 detected by prior arts, the present invention discloses that different kinds of principal components may have their own physical meanings. That is as the descriptions in the step (S6), which is of choosing a part of the data groups to be as data of feature distributions of the sample. In the initial stage, the physical meaning of every data group is determined by human beings, and it may be done by computer as well. After that, each of the resulting data group is automatically corresponded to the mechanical and magnetic features thereof by computer. As an example, based on the embodiment, a sixth principal component corresponds to the magnetic force distribution, even after detecting other types of samples such as Cobalt Ferrite ($CoFe_2O_4$) thin films, the detected data mapping to the data group of the sixth principal component is magnetic force distributions.

As shown in FIG. 10A, the tendency of the deflection of the sixth principal component goes up with time. This corresponds that the tip 122 of the probe 12 is approaching to the sample in the first period, and then the sensed magnetic force is stronger, as shown in FIG. 6. Since magnetism has the characteristics of repulsion for the like poles and attraction of the opposite poles, the brighter zones in FIG. 10B represent that the magnetism of the surface of the sample is the same as the tip's 122, and vice versa. For example, if the magnetism of the tip 122 is N pole, the magnetism in the brighter zones in FIG. 10B is also N pole, and the magnetism in the darker zones in FIG. 10B is the S pole. Compared with prior arts, the embodiment of the method for detecting the magnetic distributions of the surface of the sample is able to directly assure what the magnetism on the surface of the sample is. The prior arts need to change the magnetism of the tip of the probe, and then the tip is detected again. As it can be seen, the present invention is with higher detection efficiency. In addition, FIG. 10B is clearer than FIG. 10C in prior arts in the aspect of magnetic distributions, it obviously appears that the present invention has a better spatial resolution in magnetic detection. Further, the width of the black band in FIG. 10B is about 400 nm.

As mentioned above, the advantages of the method for detecting mechanical and magnetic features are as below:
1. Principal Components Analysis or other signal decomposition algorithms is applied to detect several kinds of features of distributions such as surface adhesion distribution, surface deformation distribution, and surface magnetic distribution, in order to promote detection efficiency.
2. The present invention is capable of detecting the magnetic distributions of the surface of the sample without twice detections.
3. The magnetism of the surface of the sample can be assured without changing the magnetic pole, N pole or S pole, of the probe.
4. Compared with the detection in prior arts, the view of the magnetic distributions of the present invention is clearer.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:
1. A method for detecting mechanical and magnetic features comprising the steps of:
    (a) providing a sensor with a probe and aiming the probe at a sample;
    (b) defining a plurality of points to be detected on the sample;
    (c) detecting one of the plurality of points via the sensor for acquiring data of the point, and comprising the steps of:
    (c1) approaching the probe to the point from a predetermined height, while collecting data on the probe's position and the forces it experiences;
    (c2) contacting the probe with the point and applying a predetermined force on the point, while collecting data on the probe's position and the forces it experiences;
    (c3) retracting the probe from the detected point until it reaches the predetermined height, while collecting data on the probe's position and the forces it experiences;
    (c4) shifting the probe to the next point to be detected and repeating the step (c1) to the step (c3);
    (d) collecting the data of each of the detected points while each of the points is in the step (c1), the step (c2) or the step (c3);
    (e) using a signal decomposition algorithm to transform the collected data to a plurality of data groups; and
    (f) choosing a part of the data groups to be as data of feature distributions of the sample.

2. The method for detecting mechanical and magnetic features according to claim 1, wherein the step (d) is to collect the data acquired in the step (c1) of each of the detected points.

3. The method for detecting mechanical and magnetic features according to claim 1, wherein the sensor is a magnetic force microscope, and one of the data groups corresponds to magnetic distributions of the sample (9).

4. The method for mechanical and magnetic features according to claim 1, wherein the signal decomposition algorithm is principal components analysis algorithm.

5. The method for detecting mechanical and magnetic features according to claim 1, wherein the data is a change of cantilever deflection of the probe (12) with respect to time.

6. The method for detecting mechanical and magnetic features according to claim 1, wherein a range of the predetermined height is 50-250 nm.

7. The method for detecting mechanical and magnetic features according to claim 1, wherein one more step between the step (e) and the step (f) is that of:
    transforming the data groups into a plan view.

8. The method for detecting mechanical and magnetic features according to claim 1, wherein the signal decomposition algorithm is selected by the group consisting of sparse coding algorithm, independent component analysis algorithm, and factor analysis algorithm.

\* \* \* \* \*